US006196779B1

(12) United States Patent
Falk

(10) Patent No.: US 6,196,779 B1
(45) Date of Patent: Mar. 6, 2001

(54) TEMPORARY FASTENER WITH PROJECTING TOOL-GUIDE BUSHING

(75) Inventor: Randall G. Falk, Lake Stevens, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/248,413

(22) Filed: Feb. 11, 1999

(51) Int. Cl.[7] .......................... F16B 13/06

(52) U.S. Cl. .......................... 411/54.1; 411/57.1; 408/79; 408/97

(58) Field of Search .......................... 411/57.1, 54, 397, 411/60.1; 408/79, 72 B, 97, 115 R, 103; 269/48–48.3

(56) References Cited

U.S. PATENT DOCUMENTS 1,336,012 * 4/1920 Woods .......................... 411/397
1,921,316 * 8/1933 Mattern .
2,136,875 * 11/1938 Blanc .
2,911,860 * 11/1959 Winslow .......................... 408/79
3,663,115 5/1972 Vindez et al. .
4,537,542 * 8/1985 Pratt .
4,548,533 * 10/1985 Pratt .
4,916,792 * 4/1990 Haubus .......................... 296/48.1
4,934,885 6/1990 Woods et al. .
5,275,515 1/1994 Leifsen .
5,303,908 * 4/1994 Halder .......................... 296/48.1
5,358,367 * 10/1994 Yang .......................... 411/397

FOREIGN PATENT DOCUMENTS

2103127 * 2/1983 (GB) .......................... 408/79

* cited by examiner

*Primary Examiner*—Flemming Saether
(74) *Attorney, Agent, or Firm*—Brooks & Kushman P.C.

(57) ABSTRACT

A fastener for temporarily securing together at least one part and a tool includes a body having a longitudinal axis, a part-engaging surface for bearing against the at least one part, and an outer surface that defines a guide bushing. A fastening mechanism projects axially from the body and is adapted to extend through the at least one part for securing the at least one part against the part-engaging surface. The fastener further includes an engaging member on the body and having a tool-engaging surface that is engageable with the tool for securing the tool to the at least one part.

15 Claims, 3 Drawing Sheets

TEMPORARY FASTENER WITH PROJECTING TOOL-GUIDE BUSHING

TECHNICAL FIELD

The invention relates to temporary fasteners used to align and secure a tool to at least one part.

BACKGROUND ART

In many environments it is necessary to temporarily secure a tool, such as a jig drill template or locating jig, to one or more parts while other operations, such as drilling and/or riveting operations, are performed. For example, temporary fasteners are often used in the aircraft industry to temporarily attach jig drill templates to a multi-layer structure in order to perform a drilling operation on the multi-layer structure. One disadvantage with prior art temporary fasteners is that the tool and the multi-layer structure must be simultaneously aligned so that the fasteners may be inserted therethrough. Furthermore, such temporary fasteners typically must be completely removed from the tool and the multi-layer structure in order to remove the tool from the multi-layer structure. As a result, the components of the multi-layer structure must then be realigned and secured together in order to complete drilling of full size holes through the components and/or to insert permanent fasteners through the components.

U.S. Pat. No. 5,275,515 discloses a fastener assembly including a locator pin which is inserted through aligned holes formed through a multi-layer structure and a drill plate. A slip bushing is placed over the locator pin, and a power fastener such as a CLECO™ fastener is used to engage one end of the locator pin for displacing the locator pin. A gauge pin is transversely positioned through the opposite end of the locator pin and pushes the multi-layer structure against the drill plate in response to displacement of the locator pin. Consequently, use of this fastener assembly requires access to both sides of the multi-layer structure. Furthermore, this fastener assembly is relatively complex and, therefore, difficult to use efficiently.

DISCLOSURE OF INVENTION

In accordance with the invention, a fastener for temporarily securing together at least one part and a tool includes a body having a longitudinal axis, a part engaging surface for bearing against the at least one part, and an outer surface that defines a guide bushing. A fastening mechanism projects axially from the body and is adapted to extend through the at least one part for securing the at least one part against the part-engaging surface. The fastener further includes an engaging member on the body, wherein the engaging member has a tool-engaging surface that is engageable with the tool for securing the tool to the at least one part.

The body preferably has a threaded portion, and the engaging member is preferably a threaded nut engageable with the threaded portion. Furthermore, the threaded nut preferably has a knurled exterior surface to facilitate hand-tightening of the nut.

BEST MODE FOR CARRYING OUT THE INVENTION

Figure 1:
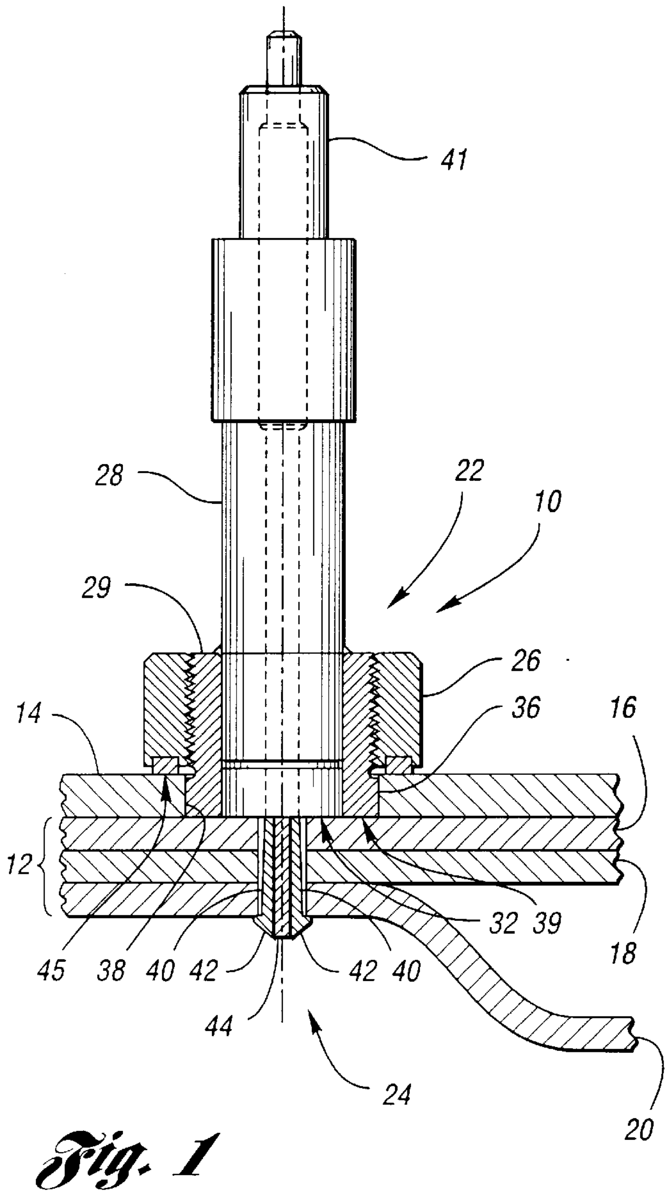
FIG. 1 is a side view of a temporary fastener according to the invention shown partially in section and securing a jig drill template to a multi-layer structure, the fastener including a body, a fastening mechanism and an encompassing, threadably-coupled engaging member, wherein the body includes a first portion and a radial projection that defines a bushing portion.

Referring to the drawings, FIG. 1 shows an exemplary fastener 10, according to the invention, which is used to align and temporarily secure together a multi-layer structure 12, as well as to align and temporarily secure a tool, such as a jig drill template (JDT) 14, to the multi-layer structure 12. The multi-layer structure 12 includes first and second sheet metal skin panels 16 and 18, respectively, and a structural element, such as a stringer 20. It is to be understood, however, that the fastener 10 may be used to locate and secure any suitable tool or tools, such as a drill jig or locating jig, to one or more parts, members or elements.

Figure 2:
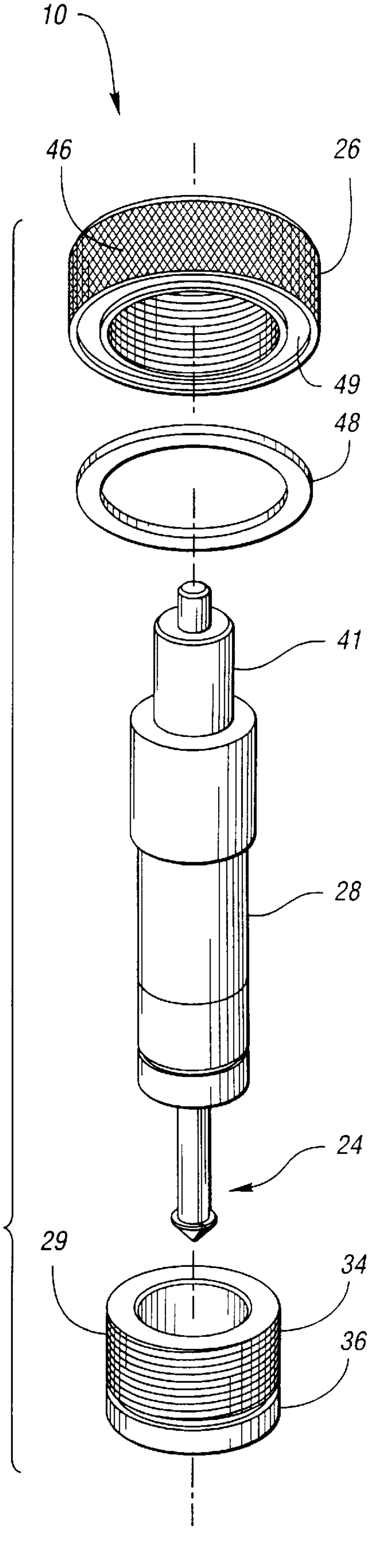
FIG. 2 is an exploded perspective view of the fastener.
Figure 3:
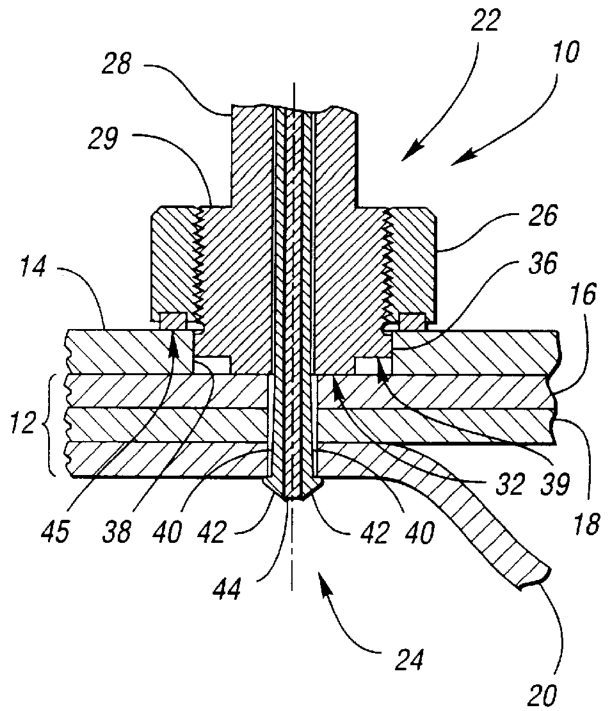
FIG. 3 is a fragmentary cross-sectional view of an alternative embodiment of the fastener wherein the first portion and the projection are integrally formed as a single piece.

As shown in FIGS. 1 and 2, the fastener 10 includes an elongate body 22, an axially-projecting fastening mechanism 24, and an encompassing engaging member, such as a jam nut 26. The body 22 preferably includes a tubular first portion 28 and a radial projection 29 proximate to one end of the first portion 28. The first portion 28 has a part-engaging end surface 32 that is engageable with the skin panel 16. The radial projection 29 is preferably defined by an annular element that is snap-fit and/or welded to the first portion 28. The radial projection 29 has a threaded portion 34, and a bushing portion 36 that is insertable into the JDT 14. The bushing portion 36 is preferably configured to mate closely with a corresponding pilot hole 38 in the JDT 14 so as to properly align the JDT 14 with respect to the multi-layer structure 12. The radial projection 29 further has an end surface 39 that is preferably coplanar with the part-engaging surface 32 and engageable with the skin panel 16. Alternatively, the radial projection 29 may be attached to the first portion 28 of the body 22 in any suitable manner, or the radial projection 29 and the first portion 28 of the body 22 may be formed integrally as a single piece as shown in FIG. 3. Also as shown in FIG. 3, the end surface 39 of the radial projection 29 need not be coplanar with the part-engaging surface 32. Alternatively, the body 22 may have any suitable configuration such that it includes at least one part-engaging surface. Furthermore, the body 22 may be provided with a circumferential flange or other spacer (not shown) for spacing the JDT 14 away from the multi-layer structure 12.

Returning to FIGS. 1 and 2, the fastening mechanism 24 preferably includes multiple tangs 40 extending from the body 22 and moveably connected to a rotatable extension 41. The tangs 40 are insertable through indexing holes or cord holes in the skin panels 16 and 18 and the stringer 20. The extension 41 is rotatably connected to the first portion

28 of the body 22, and may be rotated or driven by a suitable device such as a pneumatic hand tool. Rotation of the extension 41 in one direction causes the tangs 40 to move toward the body 22, while rotation of the extension 41 in the opposite direction causes the tangs 40 to move away from the body 22. Each of the tangs 40 has an enlarged tip 42 that is engageable with the stringer 20. The fastening mechanism 24 also includes a camming member 44 that displaces the tips 42 outwardly as the tangs 40 are moved toward the body 22 to thereby sandwich the multi-layer structure 12 between the tips 42 and the part-engaging surface 32 and/or the end surface 39 of the radial projection 29. The configuration of the fastening mechanism 24 and the first portion 28 of the body 22 as shown in the drawings is known in the art as a power fastener, such as a CLECO™ fastener available from Monogram Aerospace Fasteners of Bellevue, Washington. Alternatively, the fastening mechanism 24 may have any suitable configuration, such as a tack fastener as discussed in U.S. Pat. No. 4,934,885.

The jam nut 26 is engageable with the threaded portion 34 of the body's radial projection 29, and has a tool-engaging surface 45 that is engageable with the JDT 14 for securing the JDT 14 to the multi-layer structure 12. The nut 26 preferably has a knurled exterior surface 46 to facilitate hand-tightening of the nut 26 onto the threaded portion 34 of the body's radial projection 29, and a washer or spacer 48 to reduce wear on the JDT 14. The spacer 48 is preferably snap-fit into an annular groove 49 formed in the nut 26. While the spacer 48 may be made of any suitable material, in an exemplary embodiment, the spacer 48 is made of a nylon material. Alternatively, the engaging member may be any other suitable device, such as a snap ring or lateral pin, that can sufficiently secure the JDT 14 or other tool to the multi-layer structure 12 after the body 22 is itself secured to the structure 12.

Figure 4:
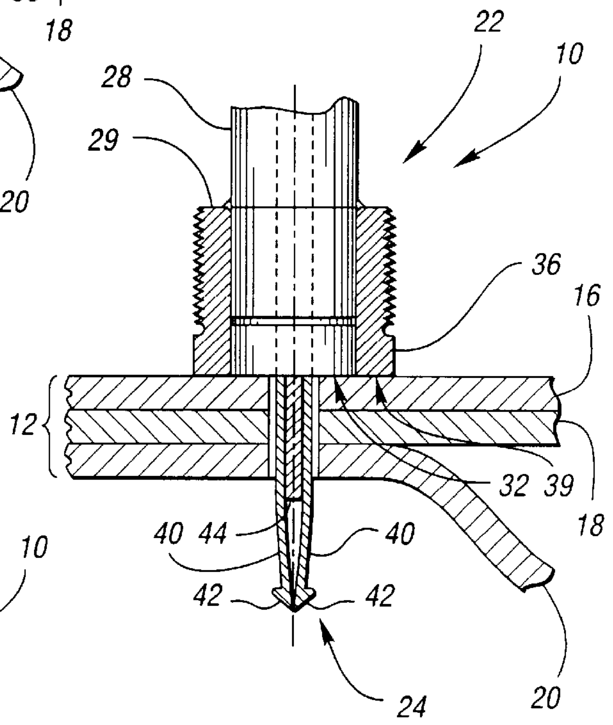
FIG. 4 is a fragmentary side view of the fastener showing the fastening mechanism extending through the multi-layer structure in an unclamped position.
Figure 5:
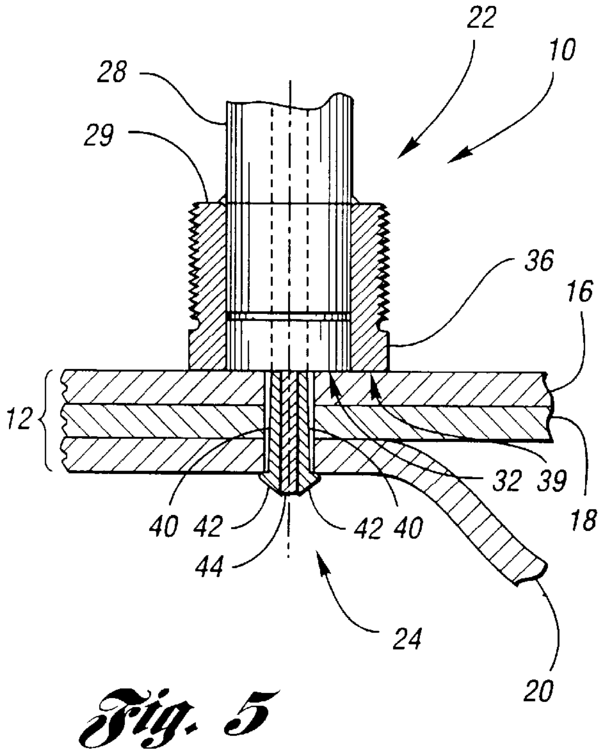
FIG. 5 is a fragmentary side view of the fastener showing the fastening mechanism in a clamped position for securing the multi-layer structure together.
Figure 6:
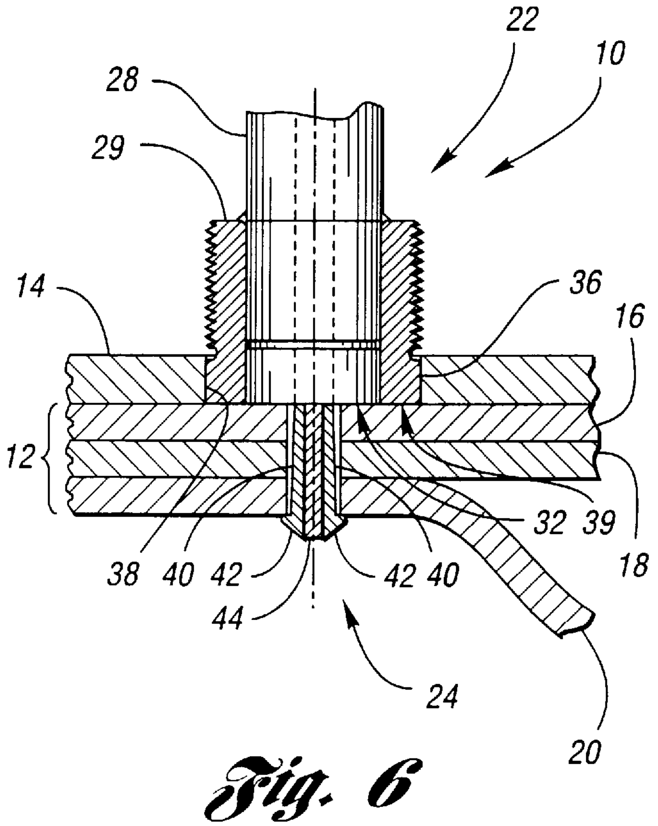
FIG. 6 is a fragmentary side view of the fastener showing the jig drill template positioned about the bushing portion of the projection.
Figure 7:
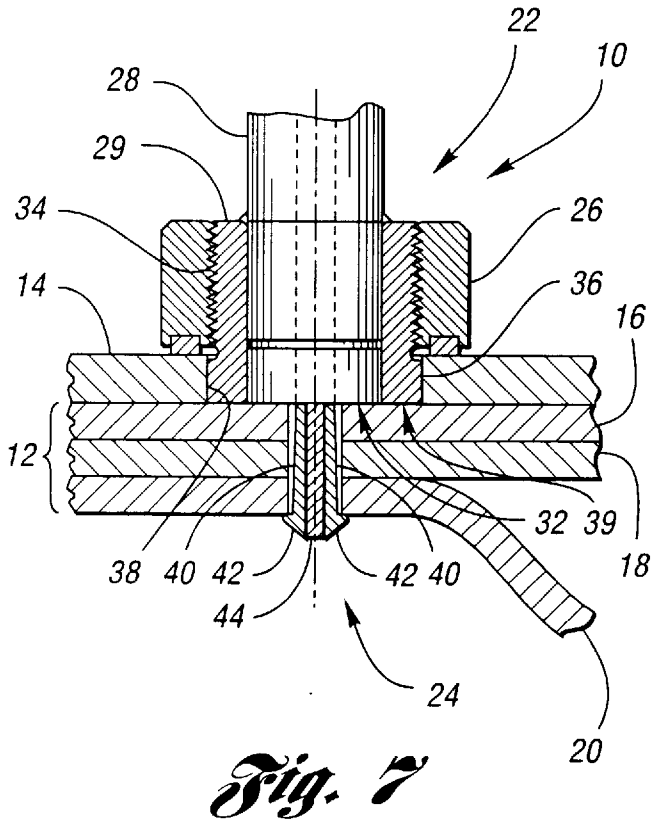
FIG. 7 is a fragmentary side view of the fastener showing the engaging member engaging the jig drill template.

To use the fastener 10, the tangs 40 are first inserted through the cord holes in the multi-layer structure 12 as shown in FIG. 4. Next, the fastening mechanism 24 is sufficiently actuated so that the tips 42 engage the stringer 20, as shown in FIG. 5, so as to draw the multi-layer structure 12 up against the part-engaging surface 32 to thereby sufficiently secure the multi-layer structure 12 together. The JDT 14 is then placed over the fastener 10 such that the pilot hole 38 is properly aligned with the bushing portion 36, as shown in FIG. 6. Next, the nut 26 is preferably hand-tightened onto the threaded portion 34 of the body's radial projection 29 to sufficiently secure the JDT 14 to the multi-layer structure 12, as shown in FIG. 7. Holes may then be drilled through the multi-layer structure 12 as guided by the JDT 14. Next, the JDT 14 is removed by simply unscrewing the nut 26 from the threaded portion 34 so that drilling of full size holes through the multi-layer structure 12 may be completed.

Advantageously, the multi-layer structure 12 will remain properly aligned and sufficiently secured together by the fastener 10 during both installation and removal of the JDT 14. Furthermore, use of the fastener 10 requires access to only one side of the multi-layer structure 12. Because the fastener 10 is used to first secure the multi-layer structure 12 together without the JDT 14 or other tool, use of the fastener 10 involves coordination of fewer components as compared with prior art fasteners. In addition, because the fastener 10 continues to secure together the multi-layer structure 12 during and after removal of the JDT 14, subsequent re-alignment and fastening together of the multi-layer structure 12 prior to performing additional operations on the multi-layer structure 12 (such as a drilling or reaming operation on at least one of the holes drilled with the aid of the JDT 14) are avoided by using one or more fasteners 10.

While an exemplary fastener has been illustrated and described, it is not intended that the exemplary fastener illustrates and describes all possible forms of the invention. Rather, it is intended that the following claims cover all modifications and alternative designs, and all equivalents, that fall within the spirit and scope of this invention.

What is claimed is:

1. A fastener for temporarily securing together at least one part and a tool, the fastener comprising:

a body having a longitudinal axis, a part-engaging surface for bearing against the at least one part, and an outer surface that defines a guide bushing adapted to guide the tool;

a fastening mechanism projecting axially from the body and adapted to extend through the at least one part, the fastening mechanism being axially moveable with respect to the body for clamping the at least one part between the part-engaging surface and the fastening mechanism; and an engaging member on the body, wherein the engaging member has a tool-engaging surface adapted to engage the tool for clamping the tool between the engaging member and the at least one part.

2. The fastener of claim 1, wherein the body includes a first portion and a radial projection extending radially beyond the first portion and wherein the radial projection defines the guide bushing.

3. The fastener of claim 2, wherein the radial projection further has a threaded portion, and the engaging member is a threaded nut engageable with the threaded portion.

4. The fastener of claim 2, wherein the first portion and the projection are integrally formed as a single piece.

5. The fastener of claim 1, wherein the engaging member is detachable from the body.

6. The fastener of claim 1, wherein the tool-engaging surface is non-coplanar with the part-engaging surface when the part-engaging surface is bearing against the at least one part and when the engaging member is engaged with the tool.

7. The fastener of claim 1, wherein the tool-engaging surface is disposed radially outwardly relative to the part-engaging surface when the engaging member is engaged with the tool.

8. The fastener of claim 1, wherein the tool-engaging surface is annular.

9. The fastener of claim 8, wherein the engaging member includes an annular insert that defines at least a portion of the tool-engaging surface.

10. The fastener of claim 1, wherein the engaging member includes a spacer that defines at least a portion of the tool-engaging surface.

11. The fastener of claim 1, wherein the body has a threaded portion, and the engaging member is a threaded nut engageable with the threaded portion.

12. The fastener of claim 11, wherein the nut has a knurled exterior surface.

13. A fastener for releasably securing together at least two parts and a tool, one of the at least two parts having a first surface, the fastener comprising:

a body having a longitudinal axis, a part-engaging surface for bearing against the first surface, a threaded portion, and a bushing portion adapted to guide the tool;

at least one tang projecting axially from the body, the at least one tang being adapted to extend through the at least two parts and being axially moveable with respect to the body for clamping the at least two parts between the part-engaging surface and the at least one tang; and a threaded nut engageable with the threaded portion and having a tool-engaging surface adapted to engage the tool for clamping the tool between the nut and the first surface such that the tool may be removed from the at least two parts by disengaging the nut from the threaded portion, without removing the body and the at least one tang from the at least two parts.

14. A fastener for temporarily securing together a part and a tool, the part having a first surface, the tool having a hole, the fastener comprising:

a body having a longitudinal axis, a radially extending part-engaging surface for bearing against the first surface, a threaded portion and a guide bushing adapted to mate with the hole of the tool;

at least one tang projecting axially from the body, the at least one tang being adapted to extend through the part and being axially moveable with respect to the body for clamping the part between the radially extending part-engaging surface and the at least one tang; and a threaded nut engageable with the threaded portion and having a radially extending tool-engaging surface adapted to engage the tool for clamping the tool between the nut and the first surface such that the tool may be removed from the part by disengaging the nut from the threaded portion, without removing the body and the at least one tang from the part.

15. The fastener of claim 14 wherein the body includes a first portion and a radial projection extending radially beyond the first portion, the first portion including the radially extending part engaging surface, and the radial projection including the threaded portion and the guide bushing.

* * * * *

UNITED STATES PATENT AND TRADEMARK OFFICE

CERTIFICATE OF CORRECTION

PATENT NO. : 6,196,779 B1
DATED : March 6, 2001
INVENTOR(S) : Randall G. Falk

It is certified that error appears in the above-identified patent and that said Letters Patent is hereby corrected as shown below:

Column 6,
Line 18, insert the following claim:
16. The fastener of claim 1 wherein the part-engaging surface is a radially extending surface.

Signed and Sealed this

Eighteenth Day of December, 2001

Attest:

JAMES E. ROGAN
*Director of the United States Patent and Trademark Office*

*Attesting Officer*